United States Patent Office 3,576,730
Patented Apr. 27, 1971

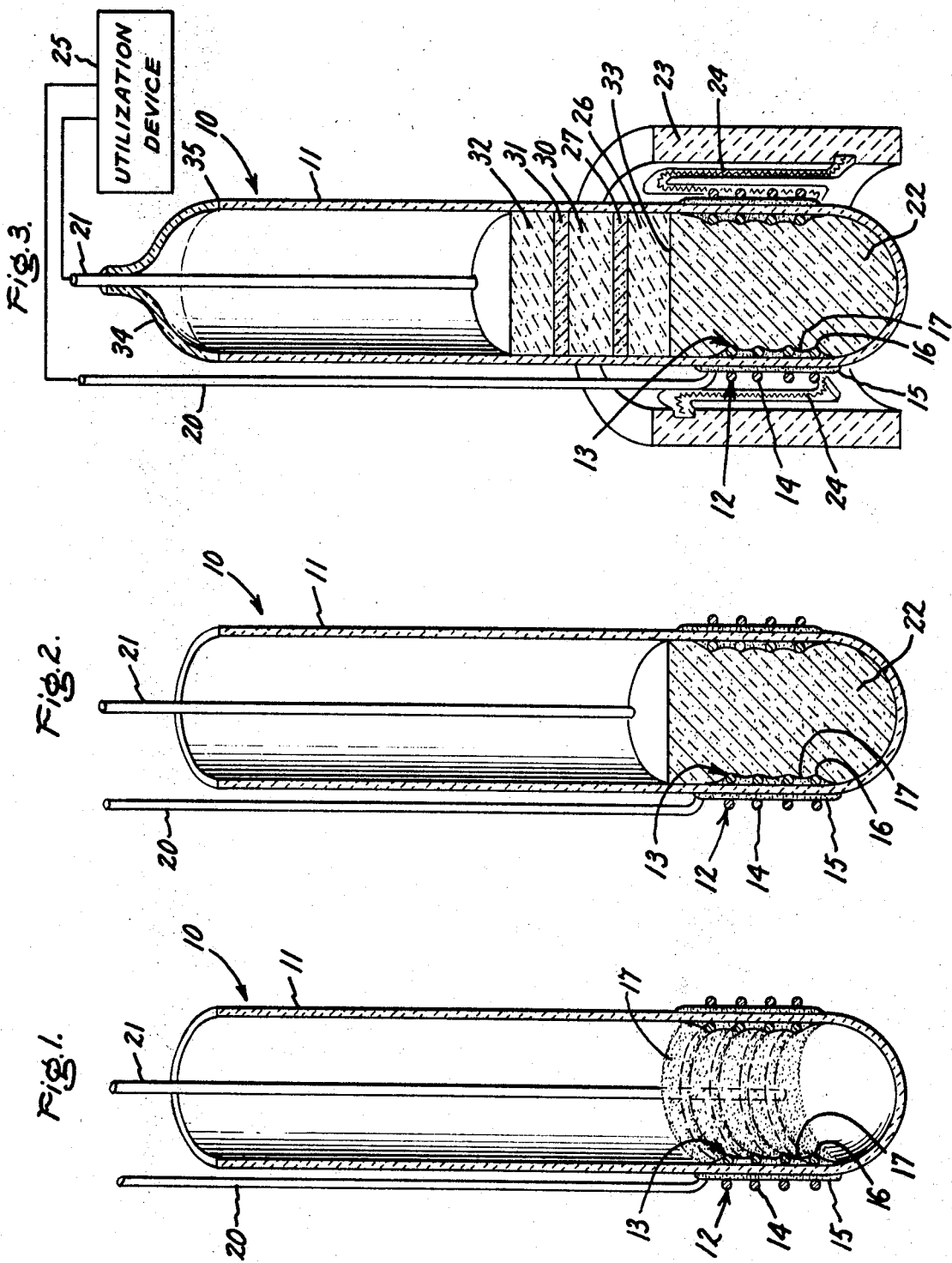

3,576,730
NICKEL/NICKEL OXIDE REFERENCE ELECTRODES FOR OXYGEN PARTIAL PRESSURE MEASUREMENTS
Henry S. Spacil, Schenectady, N.Y., assignor to General Electric Company
Filed Apr. 19, 1968, Ser. No. 722,769
Int. Cl. G01n 27/46
U.S. Cl. 204—195                                 4 Claims

ABSTRACT OF THE DISCLOSURE

A high temperature oxygen sensing cell with means for producing a partial pressure of oxygen as a reference. A mixture composed of nickel, nickel oxide and an antisintering material is compacted in a tube formed of a solid oxygen-ion electrolyte. When the resulting cell is sealed to prevent substantial quantities of environmental oxygen from reaching the mixture, a stable partial pressure of oxygen, dependent upon temperature, is produced within the tube.

BACKGROUND OF THE INVENTION

This invention relates to oxygen sensors and more particularly to high temperature, solid oxygen-ion electrolyte oxygen sensors.

Oxygen sensors using solid oxygen-ion electrolyte sensing cells provide accurate indications of the equilibrium partial pressure of molecular oxygen in a gaseous mixture. The equilibrium partial pressure of molecular oxygen is related to its oxygen potential so the readings provided by such oxygen sensing cells indicate the oxygen potential and the relative quantities of other gases in the mixture. Additional measurements permit a quantitative analysis of the molecular oxygen and other gases which influence the equilibrium partial pressure of oxygen in a gaseous mixture. Such gases may include carbon monoxide, carbon dioxide, water vapor or hydrogen.

Electrodes are mounted on the electrolyte. In the presence of gases to be measured a potential is produced across the electrolyte at the sensing cell operating temperature. This potential, which appears across the electrodes, is dependent upon the relationship of the partial pressures of oxygen in reference and sample gases which contact opposite sides of the electrolyte.

One possible reference gas is air having a stable partial pressure of oxygen. Such a reference gas permits accurate analysis of sample gases having partial pressures of oxygen to about $10^{-20}$ atmospheres. To analyze those gases with partial pressures of oxygen less than $10^{-20}$ atmospheres, a reference gas with a stable partial pressure of oxygen which is less than the partial pressure of oxygen in air must be utilized. Such a reference gas may be generated chemically by employing a mixture of a metal and its oxide, such as nickel and nickel oxide. Nickel oxide generates oxygen by dissociation at the sensing cell operating temperature. For example, at 850° C. nickel oxide in such a mixture dissociates and generates an equilibrium partial pressure of oxygen of about $10^{-13}$ atmospheres.

When nickel and nickel oxide have been mixed and added to a high temperature oxygen sensing cell, the reference pressure has been unstable with a resultant loss of accuracy and repeatability. During operation, such mixtures have separated from the electrolyte so that intimate contact between the electrolyte and the mixture of nickel and nickel oxide is lost. This separation is caused when the nickel sinters at the sensing cell operating temperature. Apparently, this separation and loss of intimate contact between the mixture and the electrolyte precludes achieving a stable reference partial pressure of oxygen.

Therefore, it is an object of this invention to provide an oxygen sensing cell which generates a stable partial pressure of oxygen for use as a reference gas.

Another object of this invention is to provide an oxygen sensing cell capable of providing accurate readings with repeatability.

Still another object of this invention is to provide an oxygen sensing cell which is capable of measuring extremely low partial pressures of oxygen in sample gases.

SUMMARY

In accordance with one aspect of this invention, an oxygen sensing cell is partially filled with a mixture composed of a metal, its oxide and an antisintering material. When a barrier is added to the sensing cell to prevent significant quantities of environmental oxygen from reaching the mixture, a stable partial pressure of oxygen is produced within the cell.

This invention is pointed out with particularity in the appended claims. A further appreciation of the above and additional objects and advantages of this invention may be obtained by referring to the following detailed description taken in conjunction with the accompanying drawings.

BRIEF DESCRIPTION OF THE DRAWINGS

FIG. 1 is a perspective view, partially cut away, to show the construction of an oxygen sensing cell to which this invention is adapted;

FIG. 2 is a perspective view, partially cut away, to show the construction of an oxygen sensing cell with means for generating a partial pressure of oxygen; and FIG. 3 is a perspective view, partially cut away, to show one embodiment of an oxygen sensing cell constructed in accordance with this invention.

DESCRIPTION OF ILLUSTRATIVE EMBODIMENTS

In the following discussion, where like numerals refer to like elements throughout, one embodiment of an oxygen sensing cell 10 comprises a tube 11 of a solid oxygen-ion electrolyte. An external electrode 12 and an internal electrode 13 are affixed to the tube 11 adjacent a closed end thereof. The external electrode 12 could include a platinum coil 14 wrapped about a platinum coated portion 15 of the tube 11. The internal electrode might be constituted by another platinum coil 16 affixed to the tube 11 by a porous binder 17 formed of the electrolyte material. A lead 20 extends from the external electrode 12; and a lead 21, from the internal electrode 13. The tube 11 may be composed of a substantially impermeable stabilized solid oxygen-ion electrolyte such as calcia-, scandia-, ytterbia- or yttria-stabilized cubic zirconia. When two gases are passed over the electrodes 12 and 13 in contact with the tube 11 and the temperature of the sensing cell 10 is elevated, a potential is produced across the tube 11 and appears at the electrodes 12 and 13. This potential, which is related to the ratio of the partial pressures of the molecular oxygen in the gases, is coupled from the electrodes 12 and 13 by means of the leads 20 and 21.

When air is the reference gas, it may be directed into the interior of the sensing cell 10 to contact the inner surface of the tube 11 and the internal electrode 13. However, the sensing cell 10 may be modified in accordance with FIG. 2 to generate its own reference partial pressure of oxygen. In accordance with this invention, an oxygen generating mixture 22 is deposited in the tube 11. Such an oxygen generating mixture could be composed of a powdered nickel and nickel oxide mixture composed of 5 to 9 parts by weight for each part of nickel oxide. A powdered nickel and nickel oxide mixture composed of 5 to 9 parts by weight nickel for each part of nickel oxide. A erating mixture. This oxygen generating mixture 22 is tamped and compacted into the tube 11 to be axially coextensive with at least the electrodes 12 and 13 and to be in intimate contact with the inner surface of the tube 11.

The antisintering material must have two properties. First, it must be compatible with all contacted materials in the sensing cell 10 throughout the operating temperature range. Secondly, dissociation of the antisintering material at the sensing cell operating temperature must produce an insignificant partial pressure in comparison to the partial pressure of oxygen produced by the nickel oxide. Certain materials which satisfy these requirements when applied to a sensing cell 10 using a stabilized zirconia tube 11 are alumina, zirconia and stabilized zirconia. The addition of such antisintering materials to the nickel and nickel oxide in the range of permissible proportions substantially eliminates separation of the oxygen generating mixture 22 from the inner surface of the tube 11.

To produce a stable partial pressure of oxygen within the sensing cell 10 for extended time periods, a barrier must prevent significant quantities of environmental oxygen from reaching the oxygen generating mixture 22. Various means may be used successfully; and the particular approach which is adopted will primarily depend upon operating requirements. In one approach, a silicone rubber stopper is wedged into the end of the tube 11. Although an extended time period might expire before equilibrium is achieved and the stable reference partial pressure of oxygen results, a satisfactory reference can be attained.

In another approach, a barrier has been constructed as shown in FIG. 3 where the sensing cell 10 is shown as an operable unit with a heater means. The heater means is schematically shown as a housing 23 which includes a heater coil 24 as an integral portion thereof. The housing 23 extends axially beyond the oxygen generating mixture 22 to provide a uniform heating zone which overlies the oxygen generating mixture 22 and the electrodes 12 and 13. A utilization device 25, connected to the leads 20 and 21, may be constituted by any potentiometric device.

The barrier of FIG. 3 is formed of compacted layers 26, 27, 30, 31 and 32. Layers 26, 30 and 32 are formed of the metal oxide while intermediate layers 27 and 31 are composed of the metal mixed with the antisintering material. Layer 26 is initially compacted against the oxygen generating mixture 22 so a resulting interface 33 and a portion of the layer 26 are uniformly heated with the oxygen generating mixture 22. The remaining layers 27, 30, 31 and 32 are removed from the uniform heating zone so a negative thermal gradient exists across the layers as they are spaced from the uniform heating zone. Although FIG. 3 illustrates a specific number of layers and serves as an adequate barrier, any number of such alternate layers may constitute the barrier.

A glass seal 34, shown in FIG. 3, is affixed to an open end 35 of the tube 11 and the lead 21 is brought through the glass seal. Before the sealing operation is completed, the entire assembly may be heated to a temperature above normally encountered operating temperatures. Simultaneously, a gas, which is substantially free of oxygen, flushes through the interior of the tube 11 to eliminate free oxygen which is present within the sensing cell 10. After flushing the materials, the seal is completed and the sensing cell 10 is cooled. By eliminating free oxygen in the sensing cell 10, attainment of an operating equilibrium partial pressure of oxygen is facilitated. As a slight vacuum exists during normal operating conditions within the tube 11, oxygen leakage from the tube is substantially eliminated.

If no seal equivalent to the glass seal 34 were used in the sensing cell 10 or if the pressure differential across the tube 11 should cause some oxygen to leak into the tube, equilibrium and a stable reference partial pressure of oxygen would still be attained and maintained. Any oxygen reaching the layers 27 and 31 would react with the metal to form metal oxide. As the temperature at the layers 27 and 31 is less than that of the oxygen generating mixture 22, dissociation of the resultant metal oxide would produce an insignificant partial pressure of oxygen. Therefore, the layers 27 and 31 constitute effective gettering means within the sensing cell 10. Any molecular oxygen which is not gettered does not reach the oxygen generating mixture 22 which necessarily has a greater partial pressure of oxygen because the temperature is greater. While several embodiments of the barrier are operable in various environments, the embodiment specifically illustrated in FIG. 3 is adapted for use in high temperature oxygen sensors because equilibrium is quickly attained.

As a specific example of an oxygen sensor which is constructed in accordance with this invention, a tube 11 was formed of calcia-stabilized zirconia. Powdered nickel, nickel oxide and calcia-stabilized zirconia were cleaned of foreign matter. An oxygen generating mixture of 60% by weight nickel, 7% by weight nickel oxide and 33% by weight stabilized zirconia was tamped and compacted to terminate approximately one-eighth inch beyond the electrodes 12 and 13 which were located adjacent a closed, integral end portion of the tube 11. Each layer 26, 30 and 32 was composed of nickel oxide which extended axially for about three-quarters of an inch while layers 27 and 31 were composed of about 67% by weight nickel and 33% by weight calcia-stabilized zirconia to constitute onequarter inch intermediate layers.

After the glass seal was affixed to the end 35 of the tube 11, the assembly was heated to 950° C. and flushed with argon at three to four standard cubic feet per hour for about fifteen minutes. After the flushing operation, the glass seal 34 was closed; and the assembly was cooled. This oxygen sensor has provided a stable partial pressure of oxygen as a reference of $10^{-13}$ atmospheres for over four months of continuous operation and has permitted the measurement of molecular oxygen in gaseous mixtures at a partial pressure of about $10^{-27}$ atmospheres.

In accordance with this invention, a sensing cell of the type designed for operation at high temperatures and including a solid oxygen-ion electrolyte is provided with a means for generating an internal reference partial pressure of oxygen so that a self-contained measuring system results. By adding the antisintering material to the metal and the metal oxide mixture which generates the partial pressure of oxygen, stable operating conditions are attained and maintained for extended periods of time, and the value of the reference becomes primarily dependent upon the sensing cell operating temperature. When nickel and nickel oxide constitute the oxygen generating mixture in combination with stabilized zirconia as the antisintering material, the reference parial pressure of oxygen is intermediate the range from 1 atmosphere to $10^{-27}$ atmospheres, which is the range normally encountered at the sensing cell operating temperatures.

It will be obvious to those of ordinary skill in the art that many modifications can be made to this invention. For example, different ratios of materials and materials other than those specified may be used without materially affecting the operation of the sensing cell. The configuration of the sensing cell might be altered as by using an electrolyte tube which is open at both ends in combination with two barrier means rather than by using a tube closed by an integral portion thereof. When this invention is applied to a sensing cell, intimate contact of the electrolyte tube and the internal electrode is not necessary so long as good electrical contact is maintained between the lead conductor from the internal electrode and the interior surface of the electrolyte tube. Therefore, it is the object of the appended claims to cover all such

What is claimed as new and desired to be secured by Letters Patent of the United States is:

1. A high temperature oxygen sensing cell for comparing the partial pressures of oxygen in a sample gas and a reference gas and generating a signal to be coupled to a utilization device comprising:
   (a) a tube composed of substantially impermeable stabilized zirconia closed at one end,
   (b) an internal electrode and an external electrode mounted to said tube, said electrodes being adapted for connection to the utilization device for measurement of electrical potentials developed across said tube,
   (c) an oxygen generating mixture composed of 5% to 50% by weight stabilized zirconia and the remainder of a mixture of 5 to 9 parts by weight nickel with one part by weight nickel oxide, said oxygen generating mixture being at least axially coextensive with said electrodes,
   (d) barrier means including layers of nickel oxide and layers of a mixture of nickel and stabilized zirconia disposed axially and alternately along said tube, one of said nickel oxide layers being contiguous with said oxygen generating mixture and sealing means for closing said tube, and
   (e) heater means to uniformly heat all said oxygen generating mixture, said electrodes, said electrolyte adjacent to said electrodes and a portion of said nickel oxide layer adjacent said oxygen generating mixture to the operating temperature of the cell whereupon said oxygen generating mixture produces a reference gas with a stable partial pressure of oxygen.

2. A high temperature oxygen sensing cell as recited in claim 1 wherein said oxygen generating mixture is composed of 60% by weight nickel, 7% by weight nickel oxide and 33% by weight of said stabilized zirconia used in said tube.

3. A high temperature oxygen sensing cell as recited in claim 2 wherein said nickel-zirconia layers in said barrier means are formed of 67% by weight nickel and 33% by weight of said stabilized zirconia used in said tube.

4. A high temperature oxygen sensing cell as recited in claim 3 wherein said oxygen generating mixture and said barrier means partially fill said tube, said tube additionally containing a gas which is at a reduced pressure and is substantially free of oxygen.

References Cited

UNITED STATES PATENTS

| | | | |
|---|---|---|---|
| 3,297,551 | 1/1967 | Alcock | 204—1.1 |
| 3,300,344 | 1/1967 | Bray et al. | 136—153 |
| 3,309,233 | 3/1967 | McPheeters et al. | 204—195 |
| 3,359,188 | 12/1967 | Fischer | 204—1.1 |
| 3,400,054 | 9/1968 | Ruka et al. | 204—1.1 |
| 3,378,478 | 4/1968 | Kolodney et al. | 204—195 |
| 3,481,855 | 12/1969 | Kolodney et al. | 204—195 |

TA-HSUNG TUNG, Primary Examiner

U.S. Cl. X.R.

136—86, 153

UNITED STATES PATENT OFFICE
CERTIFICATE OF CORRECTION

Patent No. 3,576,730      Dated April 27, 1971

Inventor(s)   Henry S. Spacil

It is certified that error appears in the above-identified patent and that said Letters Patent are hereby corrected as shown below:

Column 3, lines 2, 3, 4, after "powdered" cancel "nickel and nickel oxide mixture composed of 5 to 9 parts by weight nickel for each part of nickel oxide. A erating" and insert instead -- antisintering material could then be added to constitute 5% to 50% by weight of the final oxygen generating -

Signed and sealed this 4th day of January 1972.

(SEAL)
Attest:

EDWARD M. FLETCHER, JR.
Attesting Officer

ROBERT GOTTSCHALK
Acting Commissioner of Paten